(12) United States Patent
Enjoji et al.

(10) Patent No.: US 7,169,496 B2
(45) Date of Patent: Jan. 30, 2007

(54) FUEL CELL

(75) Inventors: Naoyuki Enjoji, Utsunomiya (JP); Hideaki Kikuchi, Tochigi-ken (JP); Kentaro Nagoshi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 10/698,662

(22) Filed: Oct. 31, 2003

(65) Prior Publication Data
US 2004/0131905 A1    Jul. 8, 2004

(30) Foreign Application Priority Data
Nov. 1, 2002    (JP)    ............................. 2002-320208

(51) Int. Cl.
*H01M 8/04*    (2006.01)
(52) U.S. Cl. ............................. 429/26; 429/12; 429/38
(58) Field of Classification Search ................ 429/26, 429/38, 12
See application file for complete search history.

(56) References Cited

U.S. PATENT DOCUMENTS

| | | | | |
|---|---|---|---|---|
| 6,306,533 | B1 * | 10/2001 | Mund et al. | ................... 429/26 |
| 6,887,610 | B2 * | 5/2005 | Elhamid et al. | ............... 429/35 |
| 2001/0046618 | A1 | 11/2001 | Okazaki et al. | |

* cited by examiner

*Primary Examiner*—Mark Ruthkosky
(74) *Attorney, Agent, or Firm*—Lahive & Cockfield, LLP; Anthony A. Laurentano, Esq.

(57) ABSTRACT

A first separator is formed by combining a resinous passage member and a metal member together. A second separator is formed by combining a resinous passage member and a metal member together. A coolant flow field is defined between the resinous passage members such that the coolant flow field is electrically insulated from the membrane electrode assembly. The metal member includes a copper member, and the metal member includes a copper member. An outer circumferential portion of the copper member and an outer circumferential portion of the copper member are electrically connected with each other.

6 Claims, 12 Drawing Sheets

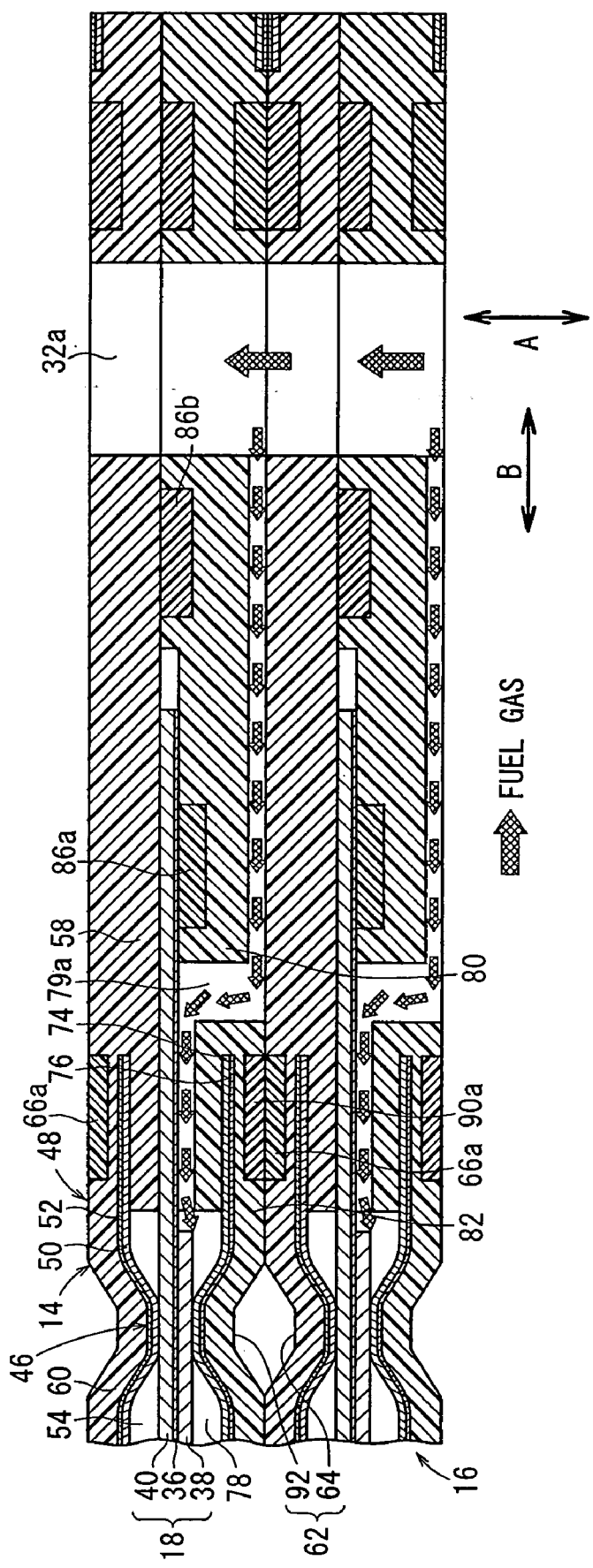

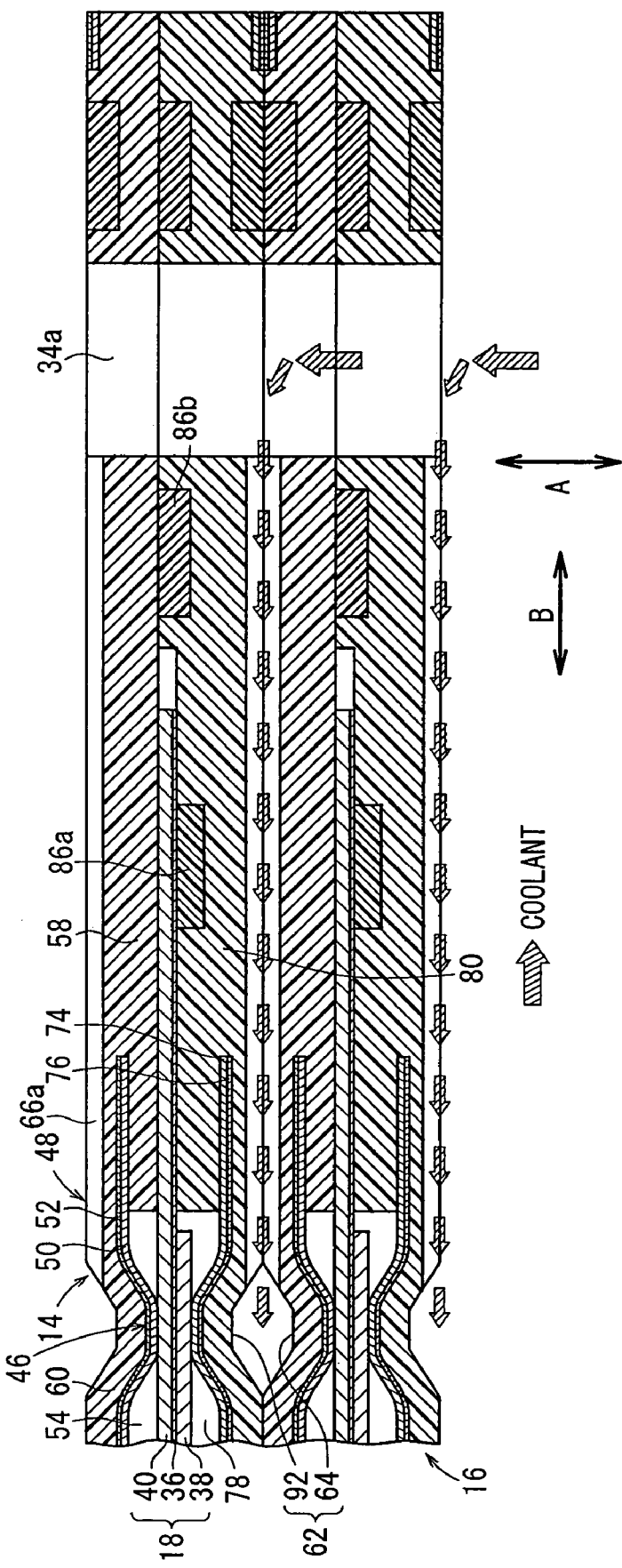

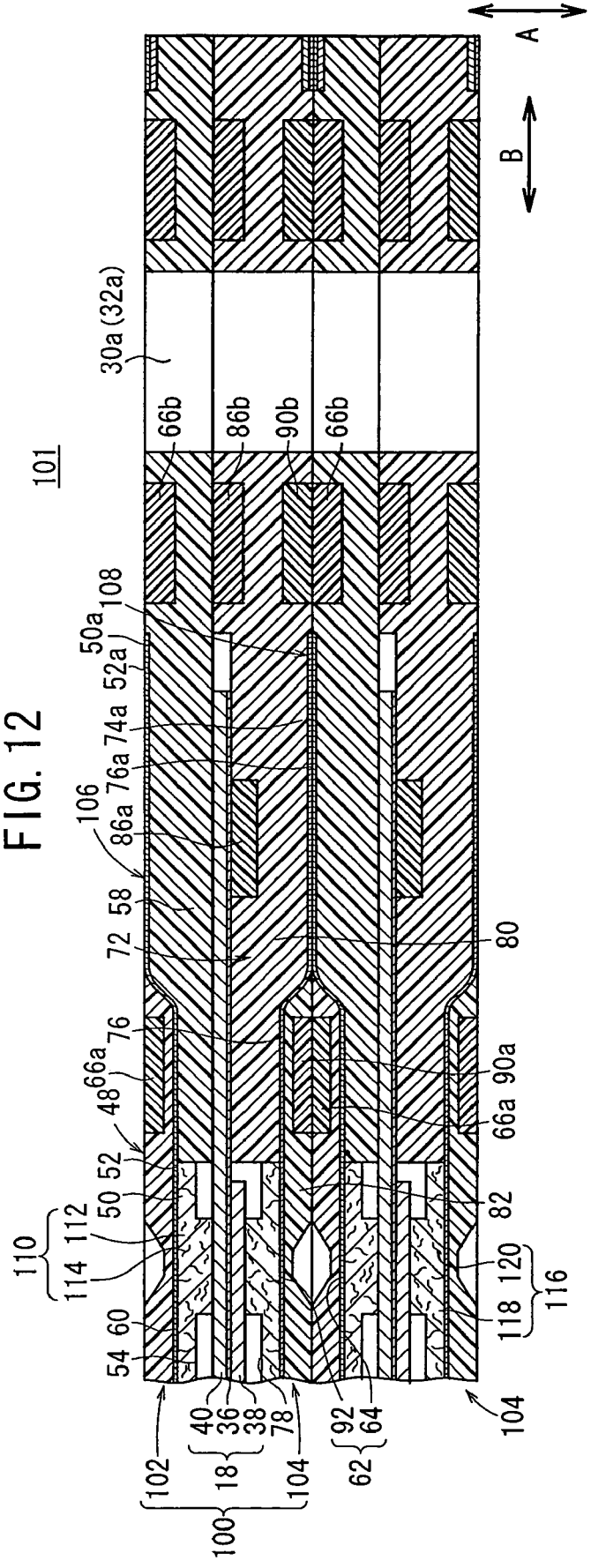

FUEL CELL

BACKGROUND OF THE INVENTION

1. Field of the Invention

The present invention relates to fuel cell including an electrolyte electrode assembly interposed between a pair of separators. The electrolyte electrode assembly includes an anode, a cathode, and an electrolyte interposed between the anode and the cathode.

2. Description of the Related Art:

For example, a solid polymer electrolyte fuel cell employs a membrane electrode assembly (MEA) which comprises a pair of electrodes (anode and cathode) and an electrolyte membrane interposed between the electrodes. The electrolyte membrane is a polymer ion exchange membrane. The membrane electrode assembly is interposed between separators (bipolar plates). The membrane electrode assembly and the separators make up a unit of the fuel cell for generating electricity. A predetermined number of fuel cells are stacked together to form a fuel cell stack.

In the fuel cell, a fuel gas (reactant gas) such as a gas chiefly containing hydrogen (hydrogen-containing gas) is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. A gas chiefly containing oxygen (oxygen-containing gas) or air is supplied to the cathode. At the cathode, the hydrogen ions from the anode combine with the electrons and oxygen to produce water.

In the fuel cell, a fuel gas flow field is formed on a surface of the separator facing the anode for supplying the fuel gas to the anode. An oxygen-containing gas flow field is formed on a surface of the separator facing the cathode for supplying the oxygen-containing gas to the cathode. Further, a coolant flow field is provided between the adjacent separators such that a coolant flows along the separators.

In the cooling system, a coolant such as water or conventional cooling liquid for vehicles contains impurities such as ions, or metallic additives. The coolant itself is electrically conductive. Thus, electrical leakages to the earth or liquid may occur, and an ion exchanger is required for preventing the leakages. If an ordinary coolant is used, the ion exchanger may not work sufficiently. Electrical leakages to the earth or liquid may occur at the time of starting operation of the fuel cell.

Therefore, pure water or the like needs to be used as the coolant in combination with the ion exchanger for keeping electrical conductivity of the coolant below a certain level. The ion exchanger needs to be periodically replaced for preventing electrical leakages to the earth or liquid. The maintenance operation is laborious, and the cooling system is not economical.

A solution to the problem proposed by the applicant of the present invention is discussed in the U.S. patent application publication No. US2001/0046618 A1. The publication discloses a fuel cell stack which effectively prevents electrical leakages through the coolant with a simple structure for maintaining a desired power generation performance.

The fuel cell stack comprises a power-generating cell which has a joined unit including an electrolyte interposed between an anode electrode and a cathode electrode. The joined unit is interposed between separators so that fuel gas is supplied to the anode electrode, while oxygen-containing gas is supplied to the cathode electrode. Further, the fuel cell stack comprises a pair of collecting electrodes which are electrically connected to a predetermined number of the power-generating cells in an integrated manner, a cooling cell to which cooling medium for cooling the power-generating cell is supplied and which is interposed between the collecting electrodes, an insulating means for electrically insulating the cooling medium from the power-generating cell and the collecting electrodes, and a conducting means for electrically connecting the power-generating cells arranged with the cooling cell interposed therebetween to one another, or the power-generating cell and the collecting electrodes to one another.

SUMMARY OF THE INVENTION

A general object of the present invention is to provide a fuel cell with a simple and compact structure in which the fuel cell can be assembled easily, and the fuel cell is economical.

According to the fuel cell of the present invention, a resinous passage member and a metal member are combined together such that the metal member covers the resinous passage member. A coolant flow field electrically insulated from the electrolyte electrode assembly is defined by the resinous passage member, and a coolant is supplied to the coolant flow field for cooling the electrolyte electrode assembly. Electric energy generated in the electrolyte electrode assembly is serially transmitted through a surface of the metal member around the resinous passage member, and collected from the electrolyte electrode assembly.

Thus, electrical leakages to the earth or liquid through the coolant do not occur, and the voltage drop of the fuel cell is prevented. The desired power generation performance of the fuel cell can be maintained reliably. Since the resinous passage member and the metal member are combined together, the fuel cell is simple and light. The overall fuel cell is considerably compact.

Preferably, the metal member is a cladding member formed of a stainless steel member and a copper member. At least a surface of the metal member exposed to a reactant gas, or the surface of the metal member around the coolant flow field is gold plated. The coolant flow field is defined by surfaces of a pair of separators. The surface of the metal member around the coolant flow field herein means the surface of each separator which surrounds the surface defining the coolant flow field.

Stainless steel is non-corrosive, and copper is highly electrically conductive. Gold plating is used for preventing elution of ions, and collecting electric energy reliably. Thus, the fuel cell can be used suitably with a good performance for a long period of time. The desired power generation performance of the fuel cell can be maintained reliably, and operation of the fuel cell can be performed economically.

Since the separator includes the resinous passage member and the metal member, dedicated cooling cells for preventing the electrical leakage to the liquid are not required. Thus, the overall fuel cell is simple and compact. The number of components of the fuel cell is small. The fuel cell can be assembled easily, and the fuel cell is economical.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10 is a cross sectional partial view showing flow of a fuel gas in the fuel cell;

FIG. 11 is a cross sectional partial view showing flow of a coolant in the fuel cell; and FIG. 12 is a cross sectional view showing a part of a fuel cell stack formed by stacking fuel cells according to a second embodiment of the present invention.

DESCRIPTION OF THE PREFERRED EMBODIMENTS

Figure 1:
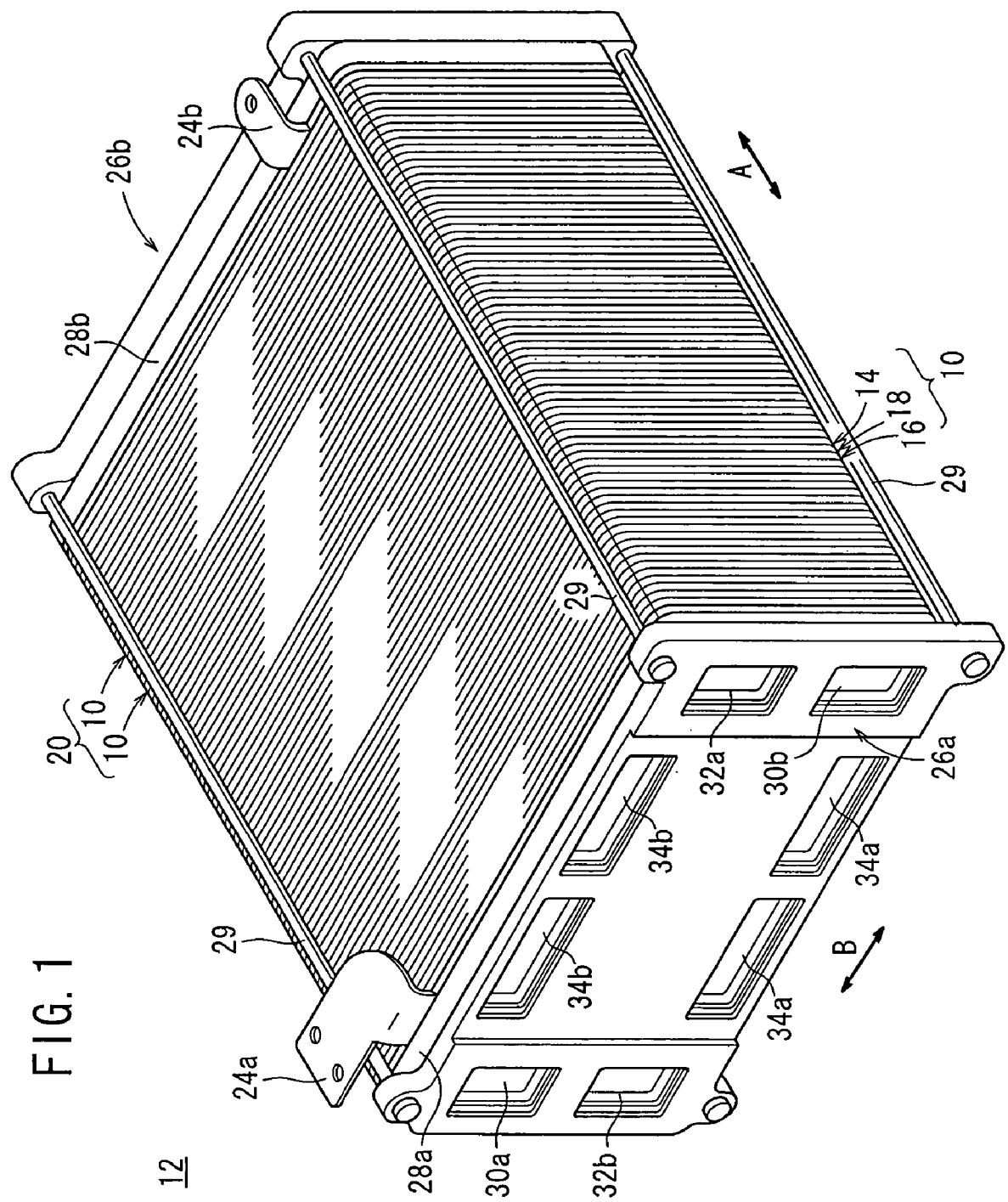
FIG. 1 is a perspective view schematically showing a fuel cell stack formed by stacking fuel cells according to a first embodiment of the present invention.
Figure 2:
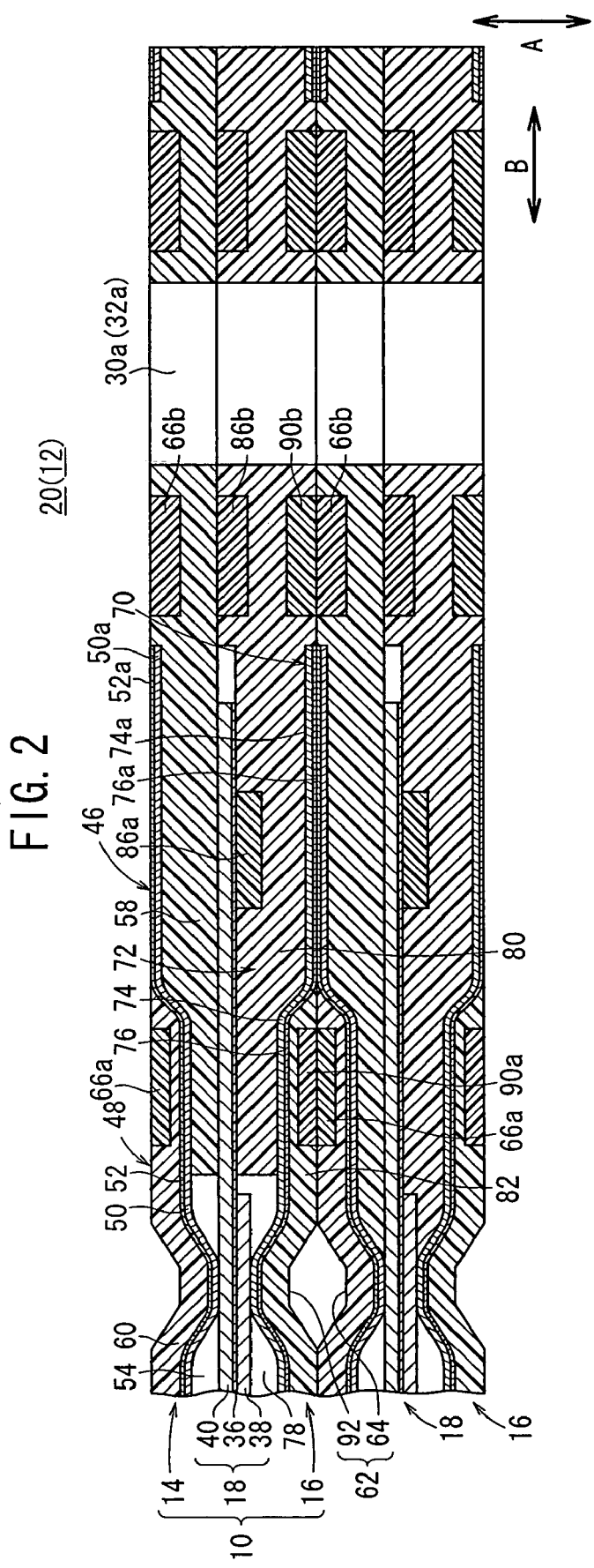
FIG. 2 is a cross sectional view showing a part of the fuel cell stack.
Figure 3:
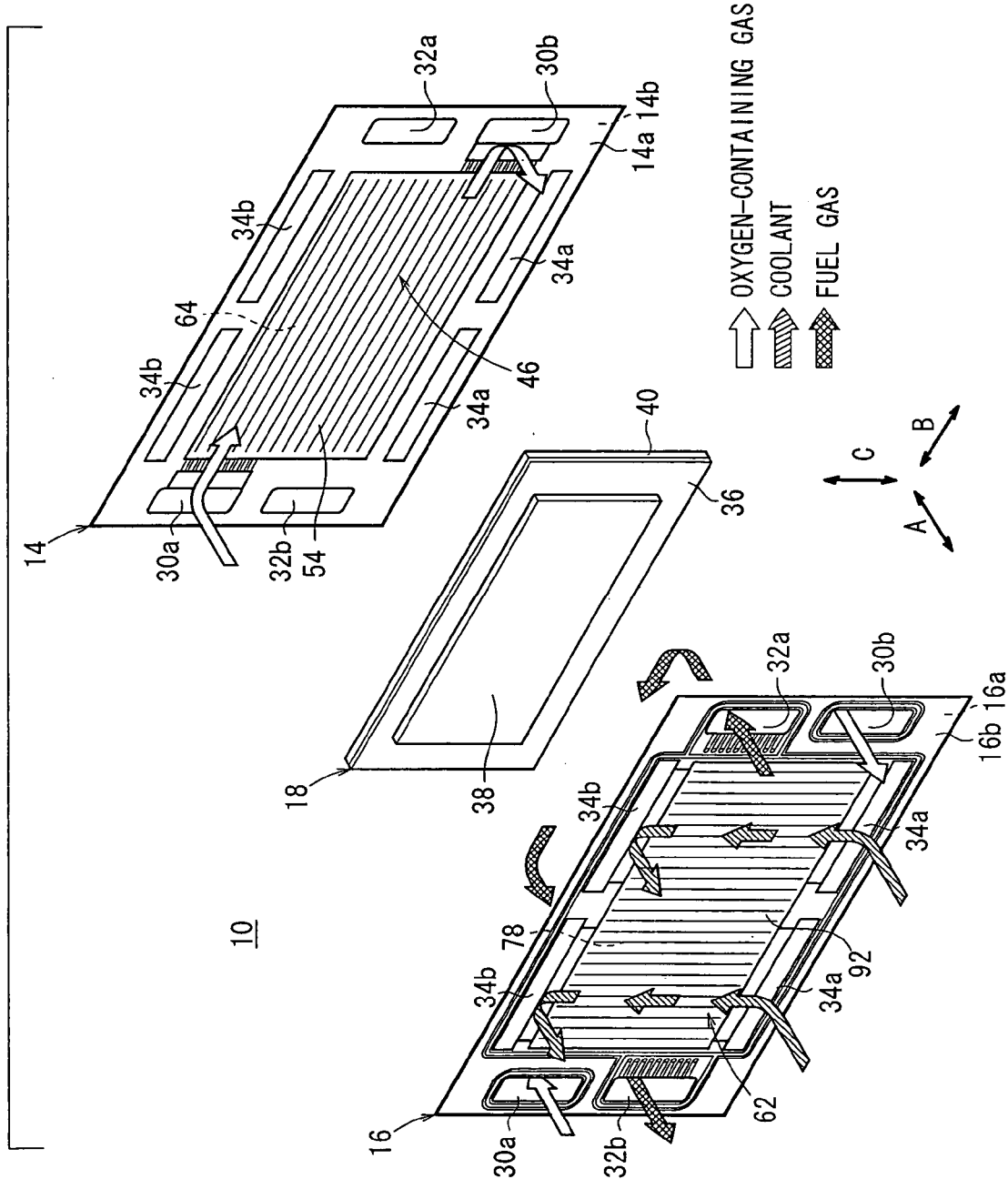
FIG. 3 is an exploded perspective view showing main components of the fuel cell.

FIG. 1 is a perspective view schematically showing a fuel cell stack 12 formed by stacking fuel cells 10 according to a first embodiment of the present invention. FIG. 2 is a cross sectional view showing a part of the fuel cell stack 12. FIG. 3 is an exploded perspective view showing main components of the fuel cell 10.

The fuel cell 10 includes a membrane electrode assembly (electrolyte electrode assembly) 18, and first and second metal separators 14, 16 for sandwiching the membrane electrode assembly 18. A plurality of the fuel cells 10 are stacked together in a direction indicated by an arrow A to form a cell assembly 20.

As shown in FIG. 1, a negative terminal plate 24a and a positive terminal plate 24b are provided at opposite ends of the cell assembly 20 in the stacking direction indicated by the arrow A. Insulating plates 28a, 28b are stacked on the outside of the negative terminal plate 24a and the positive terminal plate 24b, respectively. Further, end plates 26a, 26b are stacked on the outside of the insulating plates 28a, 28b, respectively. The cell assembly 20, the negative terminal plate 24a and the positive terminal plate 24b, the insulating plates 28a, 28b, and the end plates 26a, 26b are tightened together by a plurality of tie rods 29 extending between the end plates 26a, 26b with a predetermined tightening force.

As shown in FIG. 3, at one end of the fuel cell 10 in a horizontal direction indicated by an arrow B, an oxygen-containing gas supply passage 30a for supplying an oxygen-containing gas and a fuel gas discharge passage 32b for discharging a fuel gas such as a hydrogen-containing gas are arranged in a vertical direction indicated by an arrow C. The oxygen-containing gas supply passage 30a and the fuel gas discharge passage 32b extend through the fuel cell 10 in the stacking direction indicated by the arrow A.

At the other end of the fuel cell 10 in the direction indicated by the arrow B, a fuel gas supply passage 32a for supplying the fuel gas and an oxygen-containing gas discharge passage 30b for discharging the oxygen-containing gas are arranged in the direction indicated by the arrow C. The fuel gas supply passage 32a and the oxygen-containing gas discharge passage 30b extend through the fuel cell 10 in the direction indicated by the arrow A.

At a lower end of the fuel cell 10, two coolant supply passages 34a are provided for supplying a coolant. At an upper end of the fuel cell 10, two coolant discharge passages 34b are provided for discharging the coolant.

The membrane electrode assembly 18 comprises an anode 38, a cathode 40, and a solid polymer electrolyte membrane 36 interposed between the anode 38 and the cathode 40. The solid polymer electrolyte membrane 36 is formed by impregnating a thin membrane of perfluorosulfonic acid with water, for example. The surface area of the anode 38 is smaller than the surface area of the cathode 40.

Each of the anode 38 and the cathode 40 has a gas diffusion layer, and an electrode catalyst layer of platinum alloy supported on porous carbon particles. The carbon particles of the electrode catalyst layer are deposited uniformly on the surface of the gas diffusion layer. The electrode catalyst layer of the anode 38 and the electrode catalyst layer of the cathode 40 are fixed to both surfaces of the solid polymer electrolyte membrane 36, respectively.

Figure 4:
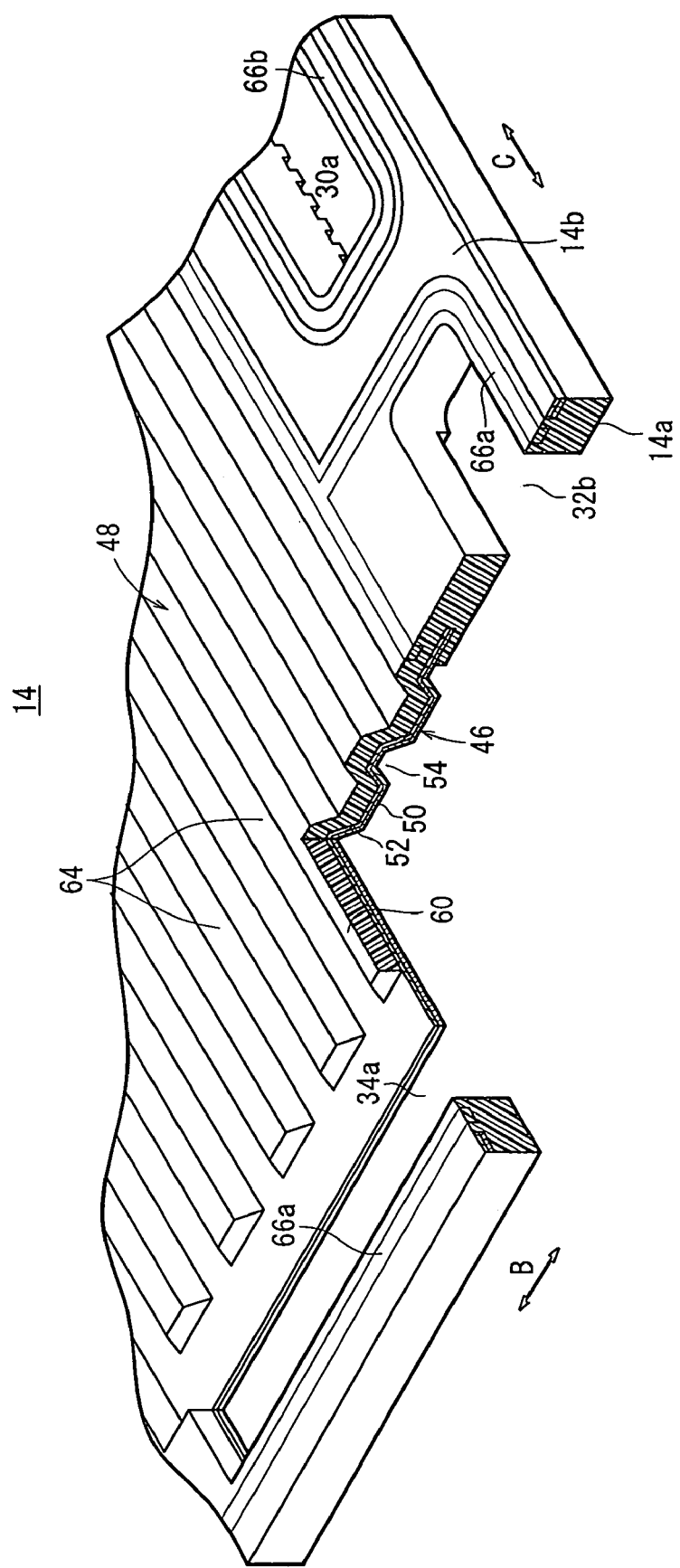
FIG. 4 is a perspective view, with a partial cut away, of a first separator of-the fuel cell.

As shown in FIGS. 2 and 4, the first separator 14 includes a metal member 46 and a resinous passage member 48. The metal member 46 and the resinous passage member 48 are formed integrally by mold forming, for example. The metal member 46 is a cladding member formed of a plate-like stainless steel member 50 and a plate-like copper member 52. The stainless steel member 50 faces the membrane electrode assembly 18. An outer circumferential portion 50a of the stainless steel member 50 and an outer circumferential portion 52a of the copper member 52 are curved away from the membrane electrode assembly 18. Preferably, a surface of the metal member 46 exposed to the oxygen-containing gas is gold plated.

As shown in FIGS. 2 through 5, an oxygen-containing gas flow field 54 is formed on the stainless steel member 50 of the metal member 46 (a surface 14a of the first separator 14 facing the cathode 40 of the membrane electrode assembly 18). For example, the oxygen-containing gas flow field 54 comprises a plurality of grooves extending in the direction indicated by the arrow B. The oxygen-containing gas flow field 54 is connected to the oxygen-containing gas supply passage 30a at one end, and connected to the oxygen-containing gas discharge passage 30b at the other end.

Figure 5:
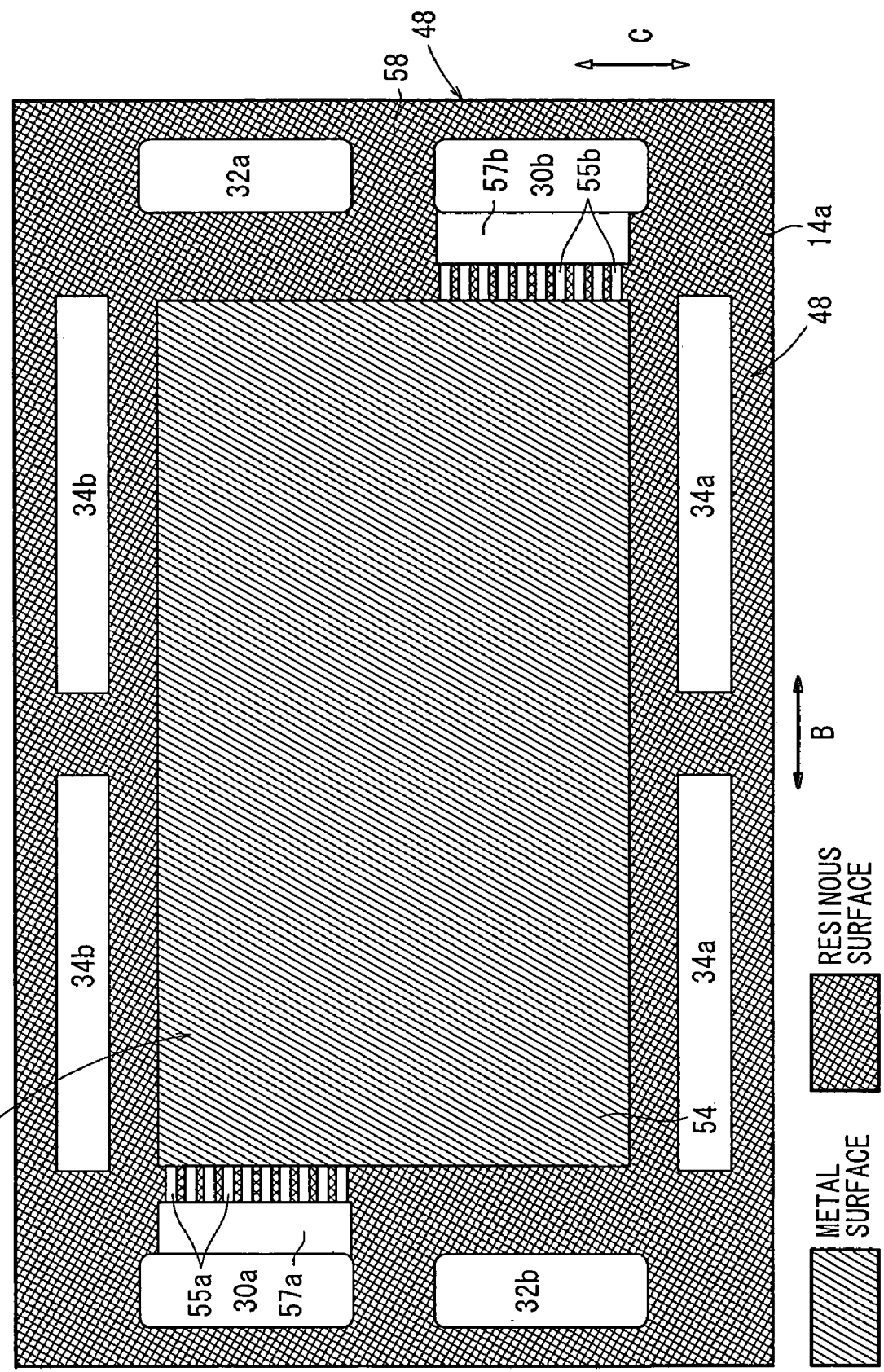
FIG. 5 is a front view showing one surface of the first separator.

As shown in FIG. 5, the oxygen-containing gas flow field 54 is connected to the oxygen-containing gas supply passage 30a through a plurality of connection grooves 55a, and connected to the oxygen-containing gas discharge passage 30b through a plurality of connection grooves 55b. Bridge plates 57a, 57b are attached to the first separator 14. The bridge plate 57a is provided near the oxygen-containing gas supply passage 30a, and the bridge plate 57b is provided near the oxygen-containing gas discharge passage 30b.

As shown in FIGS. 2, and 4 through 6, the resinous passage member 48 includes a first resinous portion 58 provided on a surface of the metal member 46 (the surface 14a of the first separator 14) to surround the oxygen-containing gas flow field 54, and a second resinous portion 60 provided on the other surface of the metal member 46 (a surface 14b of the first separator 14) to surround the oxygen-containing gas supply passage 30a, the oxygen-containing gas discharge passage 30b, the coolant supply passages 34a, and the coolant discharge passages 34b. The second resinous portion 60 defines a coolant flow field 62 as described later on.

Figure 6:
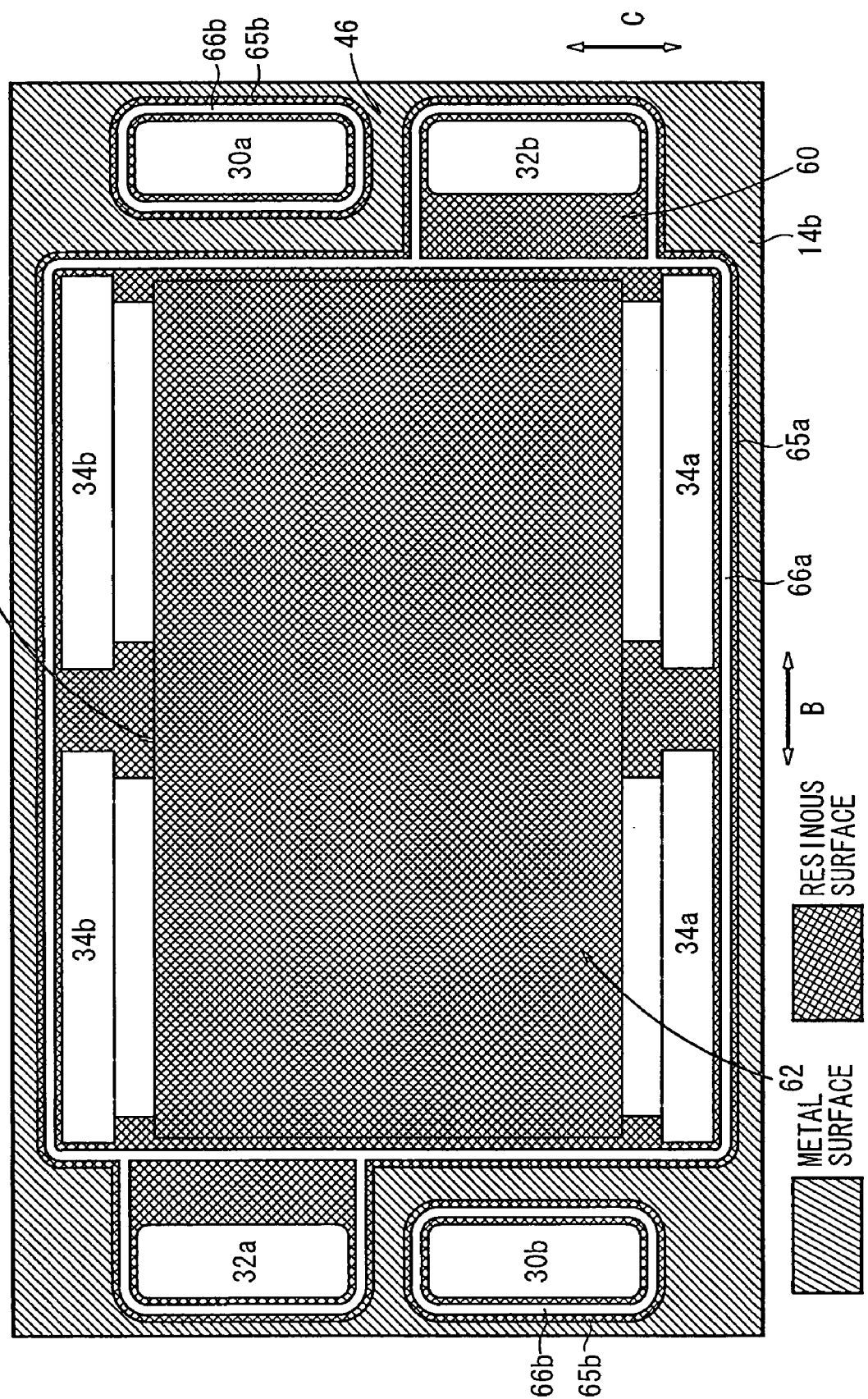
FIG. 6 is a front view showing the other surface of the first separator.

As shown in FIGS. 2, 4, and 6, the coolant flow field 62 is formed on the second resinous portion 60 (the surface 14b of the first separator 14). The coolant flow field 62 comprises a plurality of grooves 64 arranged in parallel in the direction indicated by the arrow B. The grooves 64 are connected to the coolant supply passages 34a at one end, and connected to the coolant discharge passages 34b at the other end.

As shown in FIG. 6, a first seal groove 65a is formed in the second resinous portion 60. The first seal groove 65a surrounds the coolant flow field 62, the coolant supply passages 34a, the coolant discharge passages 34b, the fuel gas supply passage 32a, and the fuel gas discharge passage 32b. A first seal 66a is provided in the first seal groove 65a.

Further, second seal grooves 65b are formed in the second resinous portion 60. The second seal grooves 65b surround the oxygen-containing gas supply passage 30a and the oxygen-containing gas discharge passage 30b. Second seals 66b are provided in the second seal grooves 65b. The first and second seals 66a, 66b may be in the form of separate rubber seals. Alternatively, the first and second seals 66a, 66b may be in the form of a silicon seal formed integrally on the surfaces 14a, 14b of the first separator 14.

As shown in FIG. 2, the second separator 16 has a substantially similar structure with the first separator 14. The second separator 16 includes a metal member 70 and a resinous member 72. The metal member 70 is a cladding member formed of a stainless steel member 74 and a copper member 76. A surface of the metal member 70 exposed to the fuel gas is gold plated as necessary. The coolant flow field 62 is defined by the surface 14b of the first separator 14b and a surface 16b of the second separator 16. A surface (outer circumferential portion 76a) of the metal member 70 around the coolant flow field 62, which in contact with the surface 14b of the first separator 14 is gold plated for improving corrosion resistance, and reducing contact resistance.

Figure 7:
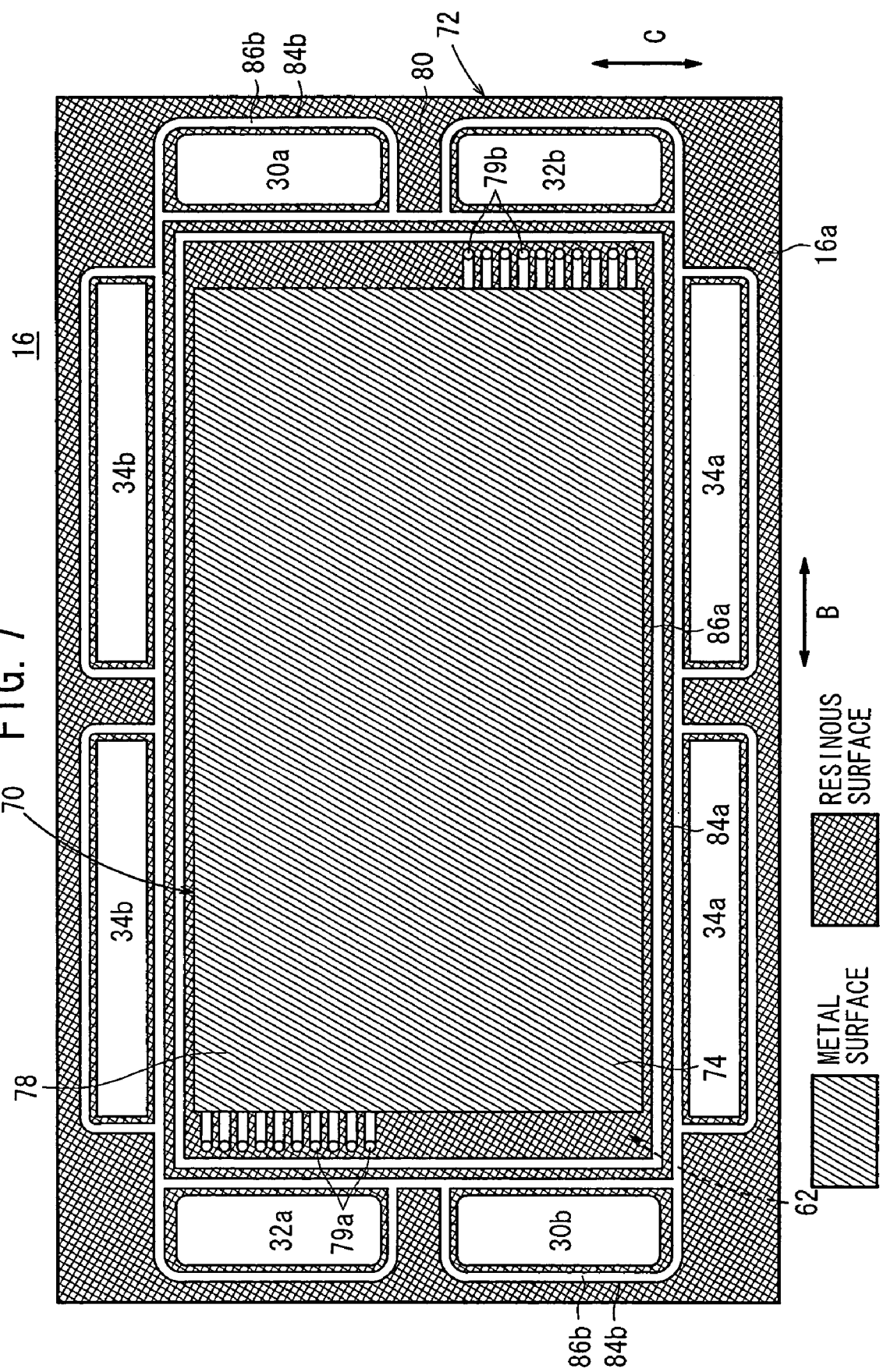
FIG. 7 is a front view showing one surface of a second separator of the fuel cell.

As shown in FIGS. 2 and 7, a fuel gas flow field 78 is formed on the stainless steel member 74 of the metal member 70 facing the anode 38 of the membrane electrode assembly 18. The fuel gas flow field 78 comprises a plurality of grooves extending in the direction indicated by the arrow B. On the surface 16b, the grooves of the fuel gas flow field 78 are connected to the fuel gas supply passage 32a at one end through a plurality of through holes 79a, and connected to the fuel gas discharge passage 32b at the other end through a plurality of through holes 79b.

Figure 8:
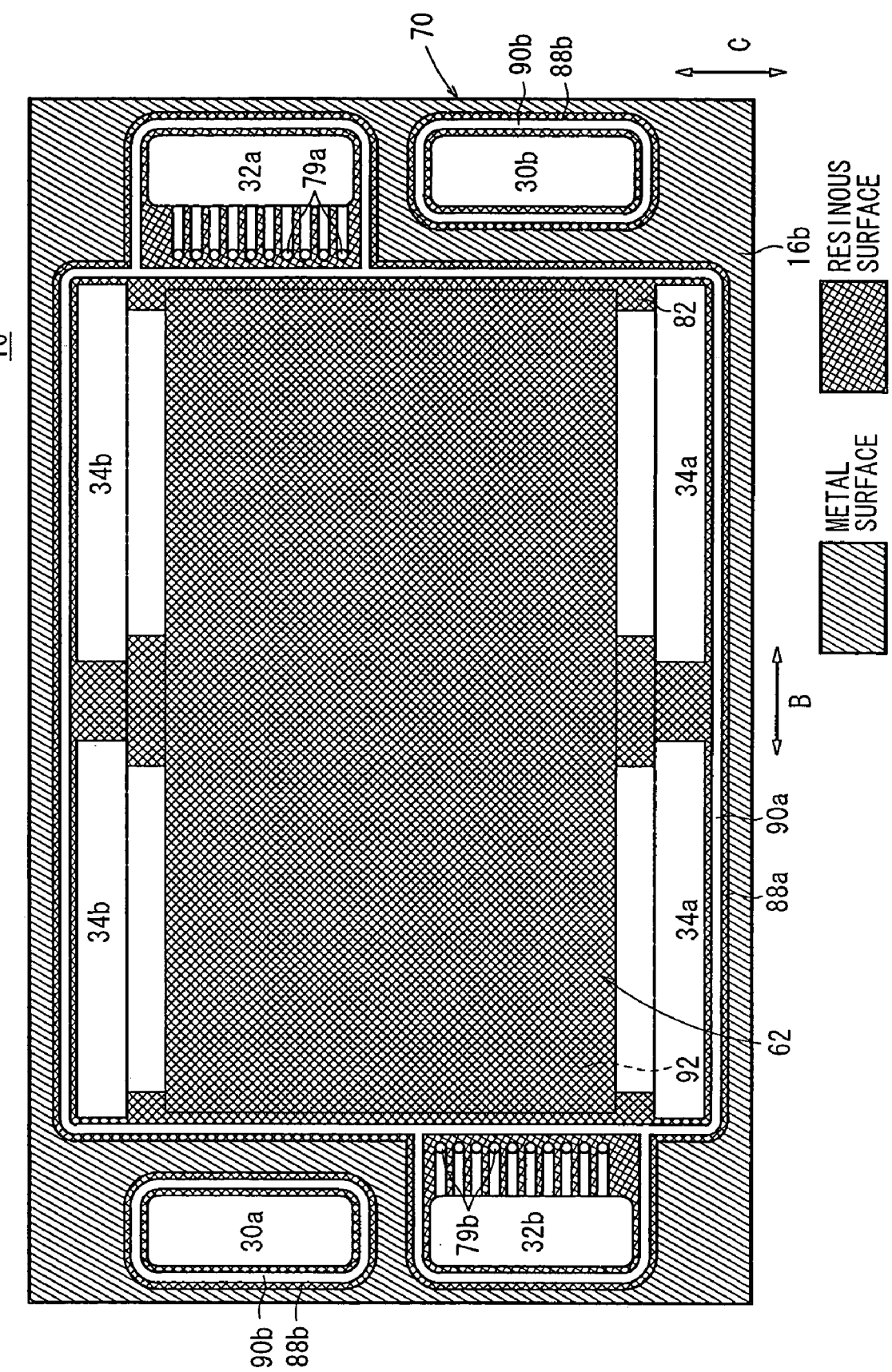
FIG. 8 is a front view showing the other surface of the second separator of the fuel cell.

As shown in FIGS. 2, and 7 through 8, the resinous passage member 72 includes a first resinous portion 80 provided on a surface of the metal member 70 (a surface 16a of the second separator 16) to surround the fuel gas flow field 78, and a second resinous portion 82 provided on the other surface of the metal member 70 (the surface 16b of the second separator 16) to surround the oxygen-containing gas supply passage 30a, the oxygen-containing gas discharge passage 30b, the fuel gas supply passage 32a, the fuel gas discharge passage 32b, the coolant supply passages 34a, and the coolant discharge passages 34b. The second resinous portion 82 defines the coolant flow field 62.

As shown in FIG. 7, a first seal groove 84a is formed in the first resinous portion 80. The first seal groove 84a surrounds the fuel gas flow field 78. Further, a second seal groove 84b is formed in the first resinous portion 80. The second seal groove 84 surrounds the coolant supply passages 34a, the coolant discharge passages 34b, the oxygen-containing gas supply passage 30a, the oxygen-containing gas discharge passage 30b, the fuel gas supply passage 32a, and the fuel gas discharge passage 32b. A first seal 86a is provided in the first seal groove 84a, and a second seal 86b is provided in the second seal groove 84b.

As shown in FIG. 8, a first seal groove 88a is formed in the second resinous portion 82. The first seal groove 88a surrounds the coolant flow field 62, the coolant supply passages 34a, the coolant discharge passages 34b, the fuel gas supply passage 32a, and the fuel gas discharge passage 32b. A first seal 90a is provided in the first seal groove 88a. Second seal grooves 80b are provided in the second resinous portion 82. The second seal grooves 80b surround the oxygen-containing gas supply passage 30a and the oxygen-containing gas discharge passage 30b. Second seals 90b are provided in the second seal grooves 88b.

As shown in FIGS. 3 and 8, the coolant flow field 62 comprises a plurality of grooves 92. The grooves 92 are connected to the coolant supply passages 34a at one end, and connected to the coolant discharge passages 34b at the other end.

Next, operation of the fuel cell 10 will be described below.

As shown in FIG. 1, an oxygen-containing gas is supplied to the oxygen-containing gas supply passage 30a, and a fuel gas such as a hydrogen-containing gas is supplied to the fuel gas supply passage 32a. Further, a coolant such as pure water, an ethylene glycol or an oil is supplied to the coolant supply passages 34a.

Figure 9:
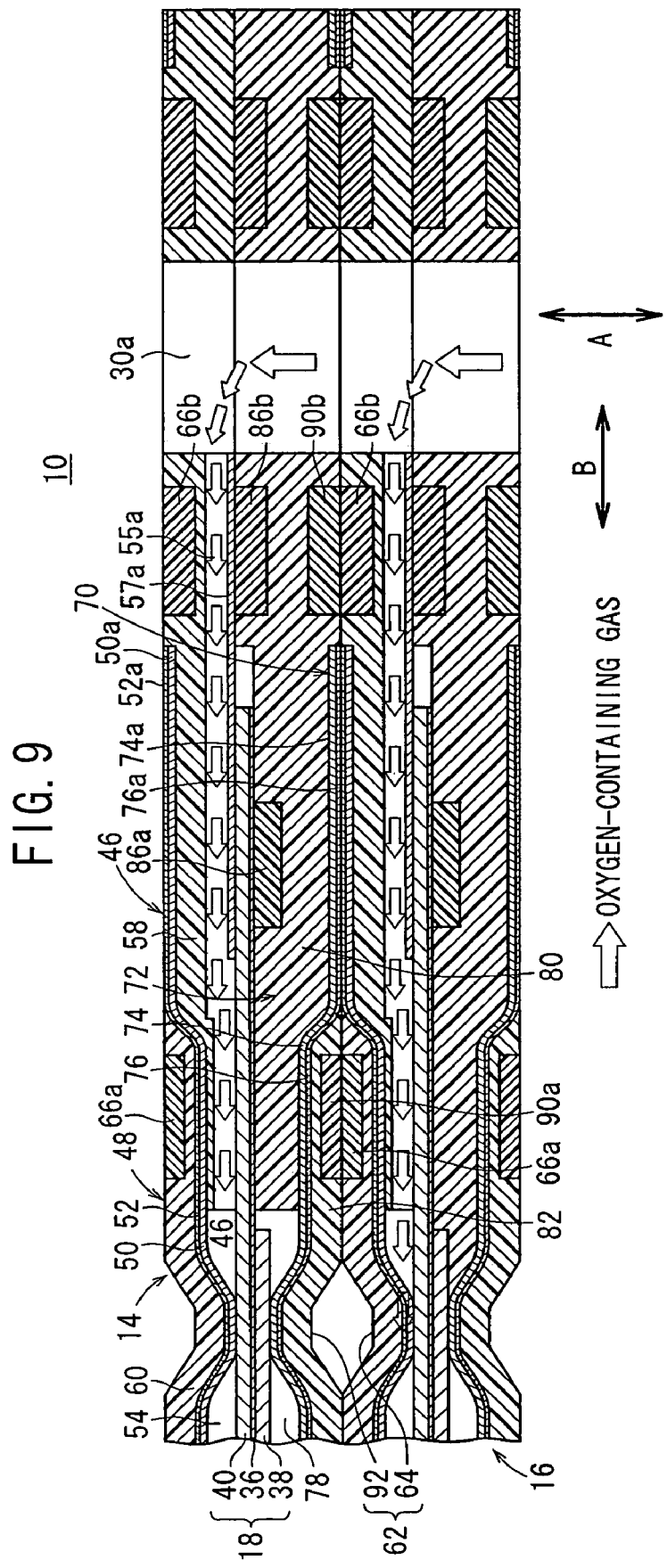
FIG. 9 is a cross sectional partial view showing flow of an oxygen-containing gas in the fuel cell.

As shown in FIGS. 3, 5, and 9, the oxygen-containing gas flows from the oxygen-containing gas supply passage 30a into the oxygen-containing gas flow field 46 formed on the first metal separator 14 through the connection grooves 55a, and flows along the cathode 40 of the membrane electrode assembly 18 to induce an electrochemical reaction at the cathode 40. As shown in FIGS. 7 and 10, the fuel gas flows from the fuel gas supply passage 32a into the fuel gas flow field 78 through the through holes 79a, and flows along the anode 38 of the membrane electrode assembly 18 to induce an electrochemical reaction at the anode 38.

In the membrane electrode assembly 18, the oxygen-containing gas supplied to the cathode 40, and the fuel gas supplied to the anode 38 are consumed in the electrochemical reactions at the electrode catalyst layers of the cathode 40 and the anode 38 for generating electricity.

After the oxygen-containing gas is consumed at the cathode 40, the oxygen-containing gas is discharged into the oxygen-containing gas discharge passage 30b, and flows in the direction indicated by the arrow A. Similarly, after the fuel gas is consumed at the anode 38, the fuel gas is discharged into the fuel gas discharge passage 32b, and flows in the direction indicated by the arrow A.

The coolant flows from the coolant supply passages 34a into the coolant flow field 62 between the first separator 14 and the second separator 16, and flows vertically (upwardly). After the coolant is used for cooling the membrane electrode assembly 18, the coolant is discharged into the coolant discharge passages 34b (see FIG. 3).

In the first embodiment, as shown in FIG. 2, the coolant flow field 62 is defined by the grooves 64, 92 when the surfaces of the resinous passage members 48, 72 are connected together. Thus, the coolant flowing through the coolant flow field 62 is electrically insulated from the membrane electrode assembly 18. During operation of the fuel cell 10, electrical leakages to the earth or liquid through the coolant do not occur.

The resinous passage members 48, 72 are formed integrally with the metal members 46, 70, respectively, by mold forming. The outer circumferential portions 52a, 76a of the copper members 52, 76 are gold plated, and connected together. Electric energy is transmitted serially in the stacking direction through the surfaces around the resinous passage members 48, 72, and collected from the membrane electrode assembly 18. The voltage drop due to electrical leakages to the earth or liquid does not occur. Thus, the desired power generation performance of the fuel cell 10 can be maintained.

The resinous passage member 48 and the metal member 46 of the first separator 14 are connected together, and the resinous passage member 72 and the metal member 70 of the second separator 16 are connected together. Thus, for example, dedicated cell structure for prevention of electrical leakage to the liquid is not required. The overall size of the fuel cell 10 is small, and the fuel cell 10 is light. The number of components of the fuel cell 10 is small. The fuel cell 10 can be assembled easily, and the fuel cell 10 is economical.

The metal member 46 is a cladding member formed of the stainless steel member 50 and the copper member 52. The metal member 70 is a cladding member formed of the stainless steel member 74 and the copper member 76. The oxygen-containing gas flow field 54 and the fuel gas flow field 78 are defined by the stainless steel members 50, 74 for improving corrosion resistance. Further, the copper members 52, 76 are used for improving electric conductivity.

The surfaces of the copper members 52, 76 exposed to the fuel gas or the oxygen-containing gas are gold plated. Thus, elution of ions does not occur, and electric energy can be collected from the fuel cell 10 reliably. The surfaces (outer circumferential portions 52a, 76a) of the surfaces 14a, 14b around the coolant flow field 62 are gold plated for improving corrosion resistance, and reducing contact resistance.

In the first embodiment, the fuel cell 10 can be used suitably with a good performance for a long period of time. The desired power generation performance of the fuel cell 10 can be maintained, and the fuel cell 10 is economical.

FIG. 12 is a cross sectional view showing a part of a fuel cell stack 101 formed by stacking fuel cells 100 according to a second embodiment of the present invention. The constituent elements of the fuel cell 100 that are identical to those of the fuel cell 10 according to the first embodiment are labeled with the same reference numeral, and description thereof is omitted.

The fuel cell 100 includes a membrane electrode assembly 18, and first and second separators 102, 104 for sandwiching the membrane electrode assembly 18. The first separator 102 includes a metal member 106, and the second separator 104 includes a metal member 108. The metal member 106 includes a copper member 52 and a foamed metal member 110 attached to the copper member 52 by brazing, for example. The foamed metal member 110 is formed by impregnating a stainless metal fiber 114 with resin 112.

Similarly, the metal member 108 includes a copper member 76, and a foamed metal member 116 attached to the copper member 76 by brazing, for example. The foamed metal member 116 is formed by impregnating a metal fiber 120 with resin 118. Surfaces of the foamed metal members 110, 116, exposed to the outside, in particular, surfaces of the foamed metal members 110, 116 facing the membrane electrode assembly 18 are gold plated.

In the second embodiment, electrical leakages to the earth or liquid through the coolant are prevented, and the desired power generation performance is maintained as with the first embodiment. The metal member 106 including the foamed metal member 110 is light, and the metal member 108 including the foamed metal member 116 is light. Thus, the overall fuel cell 100 has a lightweight.

The fuel cell according to the present invention has the resinous passage member for defining a coolant flow field insulated from the membrane electrode assembly, and the metal member for covering the resinous passage member. Thus, no electrical leakages to the earth or liquid occur, and the voltage drop of the fuel cell is prevented. The desired power generation performance of the fuel cell can be maintained reliably. Since the resinous passage member and the metal member are combined together, the fuel cell is simple and light. The overall fuel cell is considerably compact.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising:
   a plurality of electrolyte electrode assemblies each including an anode, a cathode, and an electrolyte interposed between said anode and said cathode; and
   a plurality of resinous passage members and metal portions combined together such that said metal portions cover said resinous passage members,
   wherein a coolant flow field electrically insulated from said electrolyte electrode assemblies is defined by said resinous passage member;
   a coolant is supplied to said coolant flow field for cooling said electrolyte electrode assemblies;
   each of said metal portions comprises a contact portion contacting one of said electrolyte electrode assemblies and an outer portion remote from said contact portion;
   electric energy generated in said electrolyte electrode assemblies is serially collected at said contact portion; and
   an outer portion of one of said metal portions electrically contacts an outer portion of another of said metal portions, said another metal portion is adjacent to said one metal portion on a side opposite to a contact surface of said contact portion of said one metal portion, for serially transmitting said electric energy.

2. A fuel cell according to claim 1, wherein each of said metal portions is a cladding member formed of a stainless steel member and a copper member,
   at least a surface of each of said metal portion exposed to a reactant gas, or said surface of each of said metal portions around said coolant flow field is gold plated.

3. A fuel cell according to claim 1, comprising separators for sandwiching said electrolyte electrode assemblies, each of said separators including one of said resinous passage members and one of said metal portions.

4. A fuel cell according to claim 1, wherein each of said metal portions includes a copper member and a foamed metal member attached to said copper member, and said foamed metal member is formed by impregnating a metal fiber with resin.

5. A fuel cell according to claim 4, wherein a surface of said foamed metal member exposed to the outside is gold plated.

6. A fuel cell stack formed by stacking a plurality of fuel cells each comprising:
   an electrolyte electrode assembly including an anode, a cathode, and an electrolyte interposed between said anode and said cathode; and a resinous passage member and a metal member combined together such that said metal member covers said resinous passage member, wherein a coolant flow field electrically insulated from said electrolyte electrode assembly is defined by said resinous passage member;

a coolant is supplied to said coolant flow field for cooling said electrolyte electrode assembly;

electric energy generated in said electrolyte electrode assembly is serially transmitted through a surface of said metal member around said resinous passage member, and collected from said electrolyte electrode assembly;

said metal member is a cladding member formed of a stainless steel member and a copper member;

said stainless steel member is in contact with said electrolyte electrode assembly; and said surface of said metal member around said coolant flow field is a surface of said copper member, and curved away from said electrolyte electrode assembly outwardly, said fuel cells being electrically connected in series through said surface of said copper member.

* * * * *